(12) United States Patent
Shitama et al.

(10) Patent No.: US 10,163,563 B2
(45) Date of Patent: Dec. 25, 2018

(54) REACTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Seiji Shitama, Mie (JP); Masayuki Kato, Mie (JP); Kouji Nishi, Mie (JP); Kazuhiro Inaba, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/561,182

(22) PCT Filed: Mar. 22, 2016

(86) PCT No.: PCT/JP2016/059040
§ 371 (c)(1),
(2) Date: Sep. 25, 2017

(87) PCT Pub. No.: WO2016/158579
PCT Pub. Date: Oct. 6, 2016

(65) Prior Publication Data
US 2018/0047502 A1  Feb. 15, 2018

(30) Foreign Application Priority Data

Apr. 3, 2015 (JP) ................................ 2015-077232

(51) Int. Cl.
*H01F 27/40* (2006.01)
*H01F 27/26* (2006.01)
(Continued)

(52) U.S. Cl.
CPC ............... *H01F 27/40* (2013.01); *G01K 1/14* (2013.01); *H01F 27/24* (2013.01); *H01F 27/255* (2013.01);
(Continued)

(58) Field of Classification Search
CPC ......... H01F 27/40; H01F 27/255; H01F 27/28
(Continued)

(56) References Cited

U.S. PATENT DOCUMENTS

2009/0108971 A1* 4/2009 Okamoto .............. H01F 27/266
336/65
2010/0026434 A1* 2/2010 Okamoto .............. H01F 27/266
336/65
(Continued)

FOREIGN PATENT DOCUMENTS

JP    2008182075 A  *  8/2008
JP    2009267360 A  * 11/2009
(Continued)

OTHER PUBLICATIONS

Search Report for PCT/JP2016/059040.

*Primary Examiner* — Tsz Chan
(74) *Attorney, Agent, or Firm* — Honigman Miller Schwartz and Cohn LLP

(57) ABSTRACT

Provided is a reactor in which an accessory member that is attached to the reactor is integrated with an assembly. The reactor includes an assembly of a coil having a winding portion and a magnetic core and an accessory member that is attached to the assembly. In this reactor, an outer core portion of the magnetic core is made of a composite material obtained by dispersing soft magnetic powder in a resin, the outer core portion protruding from the winding portion, and the accessory member includes an embedded portion that is (Continued)

embedded in the outer core portion and a functional portion that protrudes outward from the outer core portion.

6 Claims, 8 Drawing Sheets

(51) Int. Cl.
    *H01F 27/24*     (2006.01)
    *H01F 27/255*     (2006.01)
    *H01F 37/00*     (2006.01)
    *G01K 1/14*     (2006.01)
    *H01F 27/28*     (2006.01)

(52) U.S. Cl.
    CPC ............. *H01F 27/26* (2013.01); *H01F 27/28* (2013.01); *H01F 37/00* (2013.01)

(58) Field of Classification Search
    USPC ........................ 336/90, 92, 96, 98, 200, 232
    See application file for complete search history.

(56) References Cited

U.S. PATENT DOCUMENTS

| | | | |
|---|---|---|---|
| 2012/0126928 A1* | 5/2012 | Yoshikawa | H01F 27/306 336/221 |
| 2012/0223794 A1* | 9/2012 | Asakura | H01F 27/06 336/65 |
| 2013/0039815 A1* | 2/2013 | Murata | H01F 27/02 422/129 |
| 2014/0085026 A1* | 3/2014 | Yamada | H01F 37/00 336/90 |
| 2014/0217642 A1 | 8/2014 | Suzuki et al. | |
| 2015/0287525 A1 | 10/2015 | Yamada et al. | |

FOREIGN PATENT DOCUMENTS

| | | |
|---|---|---|
| JP | 2012-134532 A | 7/2012 |
| JP | 2013-098346 A | 5/2013 |
| JP | 2014093375 A | 5/2014 |
| JP | 2015-012146 A | 1/2015 |

\* cited by examiner

REACTOR

CROSS-REFERENCE TO RELATED APPLICATIONS

This application is the U.S. national stage of PCT/JP2016/059040 filed Mar. 22, 2016, which claims priority of Japanese Patent Application No. JP 2015-077232 filed Apr. 3, 2015.

TECHNICAL FIELD

The present invention relates to a reactor used for a constituent component or the like of an in-vehicle DC-DC converter or a power conversion device installed in an electrically driven vehicle such as a hybrid car.

BACKGROUND

Magnetic components such as reactors and motors are utilized in various fields. A reactor utilized in a converter of a hybrid car is disclosed in Patent Documents 1 and 2 as such a magnetic component.

Document 1 discloses a reactor in which an assembly of coils having winding portions and a magnetic core is accommodated in a case. JP 2012-134532A discloses a structure fixing the assembly at a predetermined position in the case by a stay that presses an upper surface of the portion protruding from the winding portions (outer core portions) of the magnetic material.

Also, JP 2014-93375A discloses a reactor including a sensor (typically, a temperature sensor for measuring the temperature of the coil) for measuring the physical quantity relating to the reactor. JP 2014-93375A discloses a structure fixing, by a sensor holder, the temperature sensor at a position between a pair of winding portions provided in coils.

In recent years, there is an increasing demand for a reactor along with the spread of electrically driven vehicles such as hybrid cars. Thus, the productivity of reactors is desired to be increased. For such a demand, there is still room for improvement of a conventional reactor on the productivity.

Here, an accessory member that directly or indirectly contributes to appropriate functions of a reactor, such as the stay disclosed in JP 2012-134532A or the sensor holder disclosed in JP 2014-93375A, is prepared separate from the assembly. Therefore, it is said that the productivity of reactors is lower by labor for assembling the accessory member into the assembly.

The present invention was made in light of the above-described circumstances, an an object of the present invention is to provide the reactor in which an accessory member that is attached to a reactor is integrated into an assembly.

SUMMARY

A reactor according to one aspect of the present invention is a reactor including an assembly of a coil having a winding portion and a magnetic core, and an accessory member that is attached to the assembly. In this reactor, an outer core portion of the magnetic core is made of a composite material obtained by dispersing soft magnetic powder in a resin, the outer core portion protruding from the winding portion, and the accessory member includes an embedded portion that is embedded in the outer core portion and a functional portion that protrudes outward from the outer core portion.

ADVANTAGEOUS EFFECTS OF INVENTION

The above-described reactor is obtained by integrating, into an assembly, an accessory member that is attached to the assembly, and thus has excellent productivity.

BRIEF DESCRIPTION OF DRAWINGS

FIG. 4 is a perspective view of a reactor according to Embodiment 2 that is partially seen through.

FIG. 7 is a perspective view of a reactor according to Embodiment 3 that is partially seen through.

DETAILED DESCRIPTION OF PREFERRED EMBODIMENTS

Figure 1:
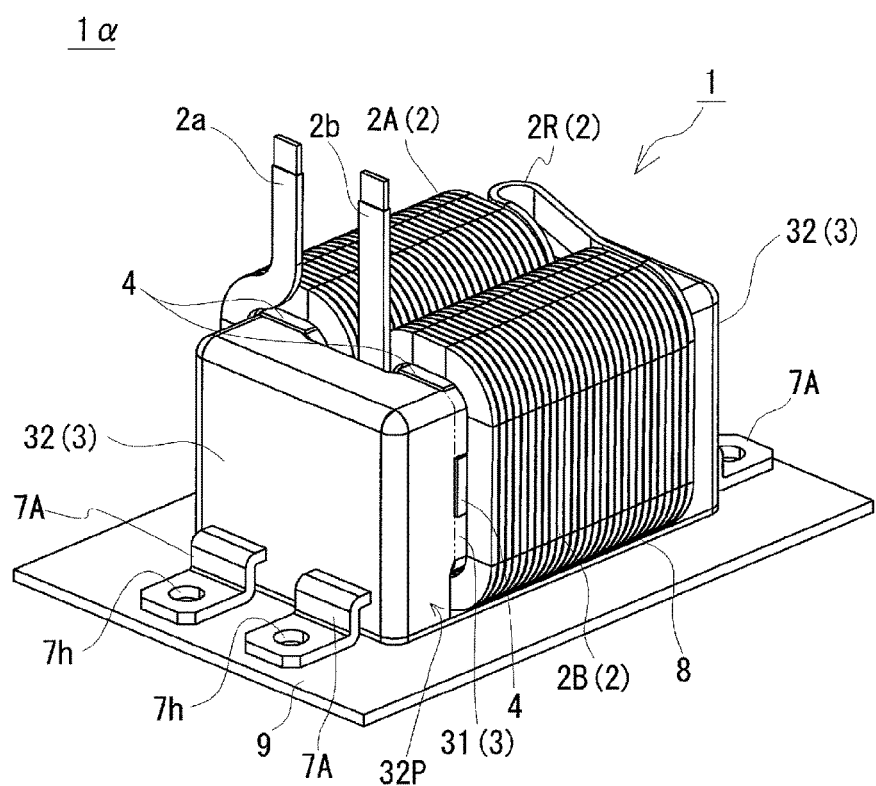
FIG. 1 is a perspective view of a reactor according to Embodiment 1.

First, various embodiments of the present invention will be listed.

1. A reactor of an embodiment is a reactor including an assembly of a coil having a winding portion and a magnetic core and an accessory member that is attached to the assembly. In this reactor, an outer core portion of the magnetic core is made of a composite material obtained by dispersing soft magnetic powder in a resin, the outer core portion protruding from the winding portion, and the accessory member includes an embedded portion that is embedded in the outer core portion and a functional portion that protrudes outward from the outer core portion.

The above-described reactor is obtained by integrating, into the outer core portion of the assembly, an accessory member that directly or indirectly contributes to appropriate functions of the reactor. Thus, when the assembly including a coil and a magnetic core is produced, the arrangement of the accessory member is also complete simultaneously, and thus the reactor can be manufactured with good productivity. Here, the embedded portion is for fixing the accessory member to the outer core portion, and the functional portion is for causing the actual function of the accessory member to exhibit.

2. One example of the reactor of this embodiment is a configuration in which the magnetic core includes an inner core portion disposed inside the winding portion, the outer core portion has a protruding portion that protrudes downward and/or upward in a height direction of the reactor with respect to the inner core portion, and the embedded portion is embedded in the protruding portion.

Magnetic flux does not pass through the protruding portion of the outer core portion much that protrudes in the height direction of the reactor. Thus, embedding the embedded portion of the accessory member at the position of this protruding portion makes it possible to integrate the accessory member into the outer core portion without reducing magnetic characteristics of the reactor.

3. Another example of the reactor of this embodiment is a configuration in which the reactor includes a placement plate on which the assembly is placed, the accessory member is a fixing member fixing the assembly onto the placement plate, and the functional portion of the fixing member is fastened to the placement plate.

The assembly can be strongly fixed onto the placement plate by embedding, in the outer core portion, the fixing member whose functional portion is fastened to the placement plate. Thus, even though the reactor vibrates during its usage, it is possible to effectively prevent the assembly from coming off from the placement plate. Also, with the configuration in which the assembly is fixed onto the placement plate by fastening the functional portion protruding from the outer core portion to the placement plate, it is possible to inhibit a clamping force from being directly applied to the outer core portion and to suppress impairment of the outer core portion made of a composite material.

4. Another example of the reactor of this embodiment is a configuration in which the reactor includes a case for accommodating the assembly, the accessory member is a positioning member that is in contact with an inner wall surface of the case and positions the assembly in the case, and the functional portion of the positioning member is formed with an elastic piece.

The position of the assembly in the case can be fixed by embedding, in the outer core portion, the positioning member having the functional portion of the elastic piece. Also, with this configuration, when the assembly is fixed to the case, the outer core portion is not easily impaired. In contrast, with the configuration using the stay in JP 2012-134532A, when the assembly is fixed into the case, a pressing force of the stay is directly applied to the outer core portion, and thus if the pressing force of the stay is excessively strong, there is a possibility that the outer core portion will be impaired.

5. Another example of the reactor of this embodiment is a configuration in which the reactor includes a temperature sensor for measuring a temperature of the reactor, and the accessory member is a sensor holding member for holding the temperature sensor.

The temperature sensor for monitoring the temperature of the reactor during its operation can be easily fixed to the assembly by embedding the sensor holding member in the outer core portion.

Hereinafter, an embodiment of the reactor of the present invention will be described with reference to the drawings. Like reference numerals in the drawings indicate an object having the same name. Note that the present invention is defined by the claims without being limited to these configurations of the embodiment, and all modifications in the meaning and scope that are equivalent to the claims are intended to be included herein.

Embodiment 1

Overall Configuration of Reactor

A reactor 1α of Embodiment 1 will be described with reference to FIGS. 1 to 3. The reactor 1α of the present embodiment shown in FIG. 1 has a configuration in which an assembly 1 including a coil 2 and a magnetic core 3 is fixed onto a placement plate 9 with a joint layer 8. A main difference between the reactor 1α of this embodiment and a conventional reactor is that a fixing member (accessory member) 7A for fastening the assembly 1 to the placement plate 9 with a screw is integrated with an outer core portion 32, which is part of the magnetic core 3. Hereinafter, configurations of the reactor 1α will be described in detail.

Assembly

An assembly 1 obtained by mechanically combining the coil 2 and the magnetic core 3 will be described mainly with reference to FIG. 2, which is an exploded perspective view of the assembly 1.

Coil

The coil 2 in the present embodiment includes a pair of winding portions 2A and 2B, and a connection portion 2R for linking the two winding portions 2A and 2B. The winding portions 2A and 2B each have a hollow tubular shape in the same winding direction with the same number of turns, and are arranged in parallel with each other such that their axial directions are parallel with each other. Also, the connection portion 2R is bent in a U-shape connecting the two winding portions 2A and 2B. This coil 2 may also be formed by helically winding one winding wire having no joint portion, or may also be formed by producing the winding portions 2A and 2B using separate winding wires and joining ends of the winding wires of the winding portions 2A and 2B by welding or crimping, for example.

The winding portions 2A and 2B of the present embodiment each have a rectangular tubular shape. The winding portions 2A and 2B having a rectangular tubular shape each have an end surface obtained by rounding corners of a rectangle (which may be a square). Of course, the winding portions 2A and 2B may also each have a tubular shape. The tubular winding portions have an end surface having a closed surface shape (elliptical shape, perfectly circular shape, race track shape, or the like).

The coil 2 including the winding portions 2A and 2B is constituted by a covered wire including an insulating coating made of an insulating material on the outer circumference of a conductor such as a flat wire or a round wire made of a conductive material such as copper, aluminum, magnesium, or their alloy. In the present embodiment, a conductor is constituted by a copper flat wire, and the winding portions 2A and 2B are formed by edgewise winding an insulating coating around a covered flat wire made of enamel (typically, polyamide imide).

Two ends 2a and 2b of the coil 2 respectively extend from the winding portions 2A and 2B, and are connected to a terminal member (not shown). An external apparatus such as a power source for supplying power to the coil 2 is connected via this terminal member.

Magnetic Core

The magnetic core 3 in this example is constituted by combining approximately U-shaped first and second split cores 3A and 3B including a pair of insertion portions that are inserted into the winding portions 2A and 2B, and two gap materials 33. Specifically, the annular magnetic core 3 is formed by disposing the gap materials 33 and 33 between front ends of the insertion portions of the first split core 3A that branches into two and front ends of the insertion portions of the second split core 3B that braches into two, and combining these two split cores 3A and 3B. The first split core 3A and the second split core 3B of the present example have the same configuration.

The above-described split cores 3A and 3B are made of a composite material containing soft magnetic powder and resin. The soft magnetic powder is an aggregate of magnetic particles made of iron-group metal such as iron, an alloy thereof (Fe—Si alloy, Fe—Ni alloy, or the like), or the like. The surface of magnetic particles may also be provided with an insulating coating made of phosphate or the like. On the other hand, thermosetting resins such as epoxy resins, phenolic resins, silicone resins, and urethane resins, thermoplastic resins such as polyphenylene sulfide (PPS) resins, polyamide (PA) resins (e.g., nylon 6 or nylon 66), polyimide resins, and fluororesins, room temperature curable resins, and low-temperature curable resins can be utilized as the resin, for example.

Also, a nonmagnetic material such as ceramics (e.g., alumina) or a resin (e.g., polypropylene) can be utilized as the gap material 33. In addition, the gap material 33 can also be constituted by an adhesive that glues together the protruding portions of the two split cores 3A and 3B that branch into two.

The magnetic core 3 obtained by combining the split cores 3A and 3B and the two gap materials 33 and 33 can be divided into the inner core portions 31 and 31 and the outer core portions 32 and 32.

Inner Core Portion

In the magnetic core 3, the inner core portion 31 is disposed inside the winding portion 2A (2B) of the coil 2. The inner core portion 31 in this example refers to a portion of the magnetic core 3 having an axial direction extending along the axial direction of the winding portions 2A and 2B of the coil 2. For example, as shown in FIG. 1, in the magnetic core 3, portions on the side of the winding portions 2A and 2B from the chain-double dashed lines shown in FIGS. 1 to 3 partially protrude outward of the winding portions 2A and 2B with respect to the end surfaces of the winding portions 2A and 2B, but these portions are regarded as inner core portions 31.

The shape of the inner core portions 31 extends along the inner shape of the winding portion 2A (2B), and in the case of this example, each inner core portion 31 has an approximately rectangular parallelepiped shape. In this example, one protruding portion of the first split core 3A, one protruding portion of the second split core 3B, and the gap material 33 held by these protruding portions form one inner core portion 31.

Outer Core Portion

The outer core portion 32 has a shape connecting ends of the pair of inner core portions 31 and 31. In this example, the outer core portion 32 has a rectangular columnar shape. Also, in the outer core portion 32, portions on the placement plate 9 (see FIG. 1) side protrude toward the placement plate 9 from the inner core portion 31 (that is, downward in the height direction of the reactor 1α). Lower protruding portions 32P that protrude downward in the height direction of the reactor 1α are substantially flush with lower surfaces (surfaces on the placement plate 9 side) of the winding portions 2A and 2B of the coil 2. Thus, the outer core portion 32 is in contact with the placement plate 9 via the joint layer 8, which will be described later.

Fixing Member

Figure 3:
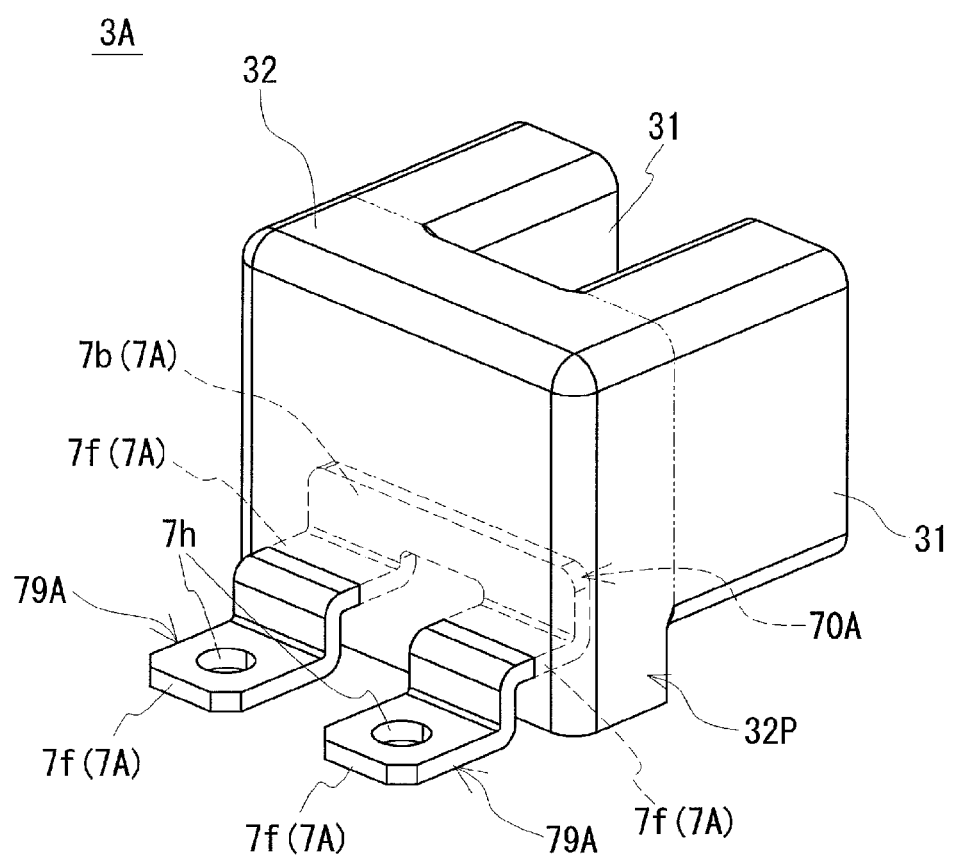
FIG. 3 is a perspective view of a split core that is partially seen through and is provided in the reactor according to Embodiment 1.

As shown in FIG. 3, the outer core portion 32 provided in the first split core 3A is integrated with the fixing member 7A (although not shown in FIG. 3, the second split core 3B is similar thereto). The fixing member 7A can be integrated with the outer core portion 32 by insert molding, for example. The fixing member 7A in this example is approximately U-shaped and is constituted by a pair of leg pieces 7f and 7f and a connection piece 7b that connects these legs 7f and 7f. The connection piece 7b and portions of the leg pieces 7f and 7f on the connection piece 7b side are embedded in the lower protruding portion 32P of the outer core portion 32 (embedded portions are referred to as "embedded portion 70A"). On the other hand, in the leg pieces 7f and 7f of the fixing member 7A, portions other than the embedded portion 70A (functional portion 79A) protrude outward from the outer core portion 32 (the side opposite to the inner core portion 31). As shown in FIG. 1, the functional portion 79A exhibits the actual function of the fixing member 7A, namely to fix the assembly 1 onto the placement plate 9.

The connection piece 7b of the embedded portion 70A is a plate-shaped member having a flat surface that is orthogonal to the axial direction of the inner core portion 31. The plate-shaped connection piece 7b and the leg pieces 7f and 7f are connected in an L-shape when viewed from the side of the first split core 3A. Thus, the fixing member 7A does not come off from the outer core portion 32 due to the connection piece 7b retaining the fixing member 7A.

Here, magnetic flux hardly passes through the lower protruding portion 32P in which the majority of the embedded portion 70A is disposed. Thus, the embedded portion 70A hardly reduces the magnetic characteristics of the magnetic core 3.

The length of the connection piece 7b in the direction in which the inner core portions 31 and 31 are arranged in parallel with each other is approximately about 80% the length of the outer core portion 32 in the direction in which these inner core portions 31 and 31 are arranged in parallel with each other. In this manner, the fixing member 7A does not easily come off from the outer core portion 32 due to the large contact area between the embedded portion 70A and the outer core portion 32. Also, when a stress such as bending is applied to the functional portion 79A of the fixing member 7A, the outer core portion 32 is not easily impaired due to this large contact area. This is because the stress that is applied to the outer core portion 32 is distributed via the fixing member 7A.

Meanwhile, the functional portion 79A (part of the leg piece 7f) has a stepwise shape. In this stepwise functional portion 79A, a lower surface of the lower portion is substantially flush with the lower surface of the lower protruding portion 32P, and as shown in FIG. 1, this lower surface comes into contact with the placement plate 9 when the assembly 1 is disposed on the placement plate 9. This lower portion is provided with a screw hole 7h, and the assembly 1 can be fastened onto the placement plate 9 with a screw via this screw hole 7h (the screw is omitted in FIG. 1).

A material of the fixing member 7A can be selected as appropriate. For example, the fixing member 7A may be made of metal or resin. In particular, the fixing member 7A is preferably made of metal because there is a low possibility that the functional portion 79A will be impaired even if the clamping force of the screw is applied to the functional portion 79A of the fixing member 7A. A nonmagnetic metal such as aluminum, magnesium, or alloy thereof is preferable as the metal.

Placement Plate

Figure 2:
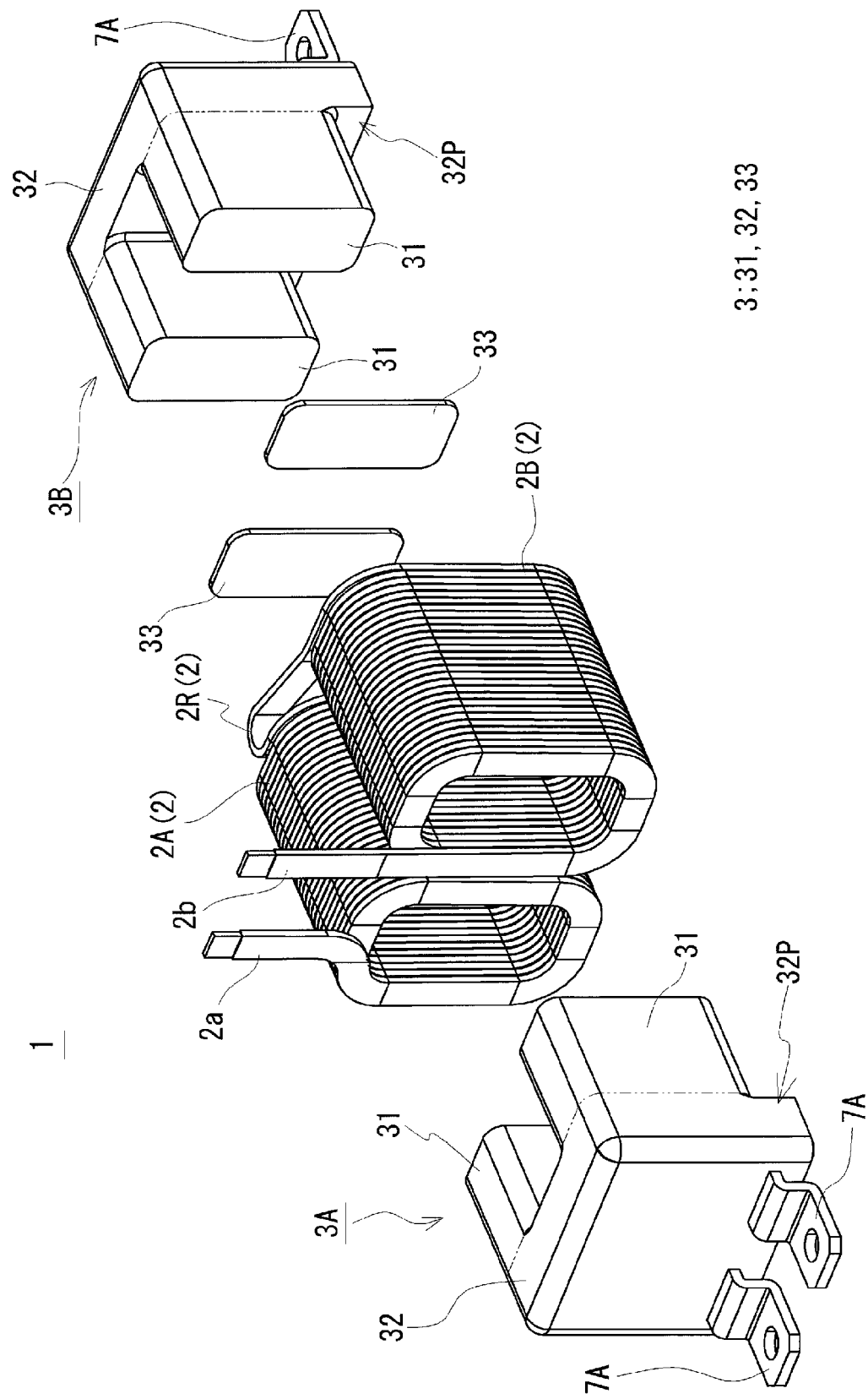
FIG. 2 is an exploded perspective view of an assembly provided in the reactor according to Embodiment 1.

The placement plate 9 shown in FIG. 1 functions as a base when the reactor 1α is fixed to an object on which the reactor 1α is installed, such as a cooling base. Thus, the placement plate 9 needs to have excellent mechanical strength. Also, the placement plate 9 needs to release heat generated in the assembly 1 during use of the reactor 1α to the object on which the reactor 1α is installed. Thus, the placement plate 9 needs to have an excellent heat dissipation property in addition to excellent mechanical strength. In order to meet such demand, the placement plate 9 is made of metal. For example, aluminum, an alloy thereof, magnesium, or an alloy thereof can be utilized as the material for constituting the placement plate 9. These metals (alloys) are advantageous in excellent mechanical strength and thermal conductivity, light weight, and being nonmagnetic.

The reactor 1α can be fixed to the object on which the reactor 1α is installed, such as a cooling base, by forming an attachment hole in the placement plate 9 and fixing reactor 1α to this object together with the placement plate 9.

Joint Layer

The joint layer 8 for joining the placement plate 9 and the assembly 1 is formed between the above-described placement plate 9 and the assembly 1. This joint layer 8 also has a function of transmitting heat generated in the assembly 1 during use of the reactor 1α to the placement plate 9.

The joint layer 8 is made of an insulating material. Examples of the material include thermosetting resins such as epoxy resins, silicone resins, and unsaturated polyesters and thermoplastic resins such as PPS resins and LCPs. The heat dissipation property of the joint layer 8 may also be increased by adding the above-described ceramic filler or the like to these insulating resins. The heat conductivity of the joint layer 8 is preferably at least 0.1 W/m·K, more preferably at least 1 W/m·K, and particularly preferably at least 2 W/m·K.

The joint layer 8 may also be formed by applying an insulating resin (ceramic filler-containing resin is possible) onto the placement plate 9, or may also be formed by attaching an insulating resin sheet material onto the placement plate 9. Use of a sheet material as the joint layer 8 is preferable because the joint layer 8 can be easily formed on the placement plate 9.

Other Configuration

In addition to the above-described configurations, the reactor 1α of Embodiment 1 may also be provided with adhesive sheets 4 (FIG. 1) that are disposed between the outer circumferential surface of the inner core portion 31 and the inner circumferential surfaces of the winding portions 2A and 2B and that attach the inner core portion 31 and the winding portions 2A and 2B to each other. A relative position between the coil 2 and the magnetic core 3 can be fixed by the adhesive sheets 4, and thus it is possible to inhibit the relative position between the coil 2 and the magnetic core 3 from shifting due to vibration or the like.

The adhesive sheet 4 can be made of a viscous insulating resin, for example, a thermosetting resin such as epoxy resin, silicone resin, and unsaturated polyester or a thermoplastic resin such as a PPS resin and LCP. The heat dissipation property of the adhesive sheet 4 may also be increased by adding the above-described ceramic filler or the like to these insulating resins. Also, the adhesive sheet 4 can be made of resin foam. If the adhesive sheet 4 is made of resin foam, insertion portions of the split cores 3A and 3B can be easily inserted into the winding portions 2A and 2B after the adhesive sheets are attached to the split cores 3A and 3B. The coil 2 and the magnetic core 3 can be fixed by the resin foam undergoing foaming after the insertion portions are inserted into the winding portions 2A and 2B.

Effects of Reactor

With the reactor 1α described above, the assembly 1 is strongly kept fixed onto the placement plate 9 even though the assembly 1 vibrates during its operation. This is because the fixing member 7A that fixes the assembly 1 onto the placement plate 9 is integrated with the outer core portion 32 (split cores 3A and 3B).

Also, the above-described reactor 1α has excellent productivity. This is because the fixing member 7A is integrated with the outer core portion 32 and thus the arrangement of the fixing member 7A with respect to the assembly 1 also ends when the assembly 1 is produced by assembling the magnetic core 3 into the coil 2.

Embodiment 2

In Embodiment 2, with reference to FIGS. 4 to 6, a reactor 1β will be described that includes a case 5 for accommodating an assembly 1 and in which a positioning member (accessory member) 7B for positioning the assembly 1 in the case 5 is embedded in an outer core portion 32.

Case

Figure 4:
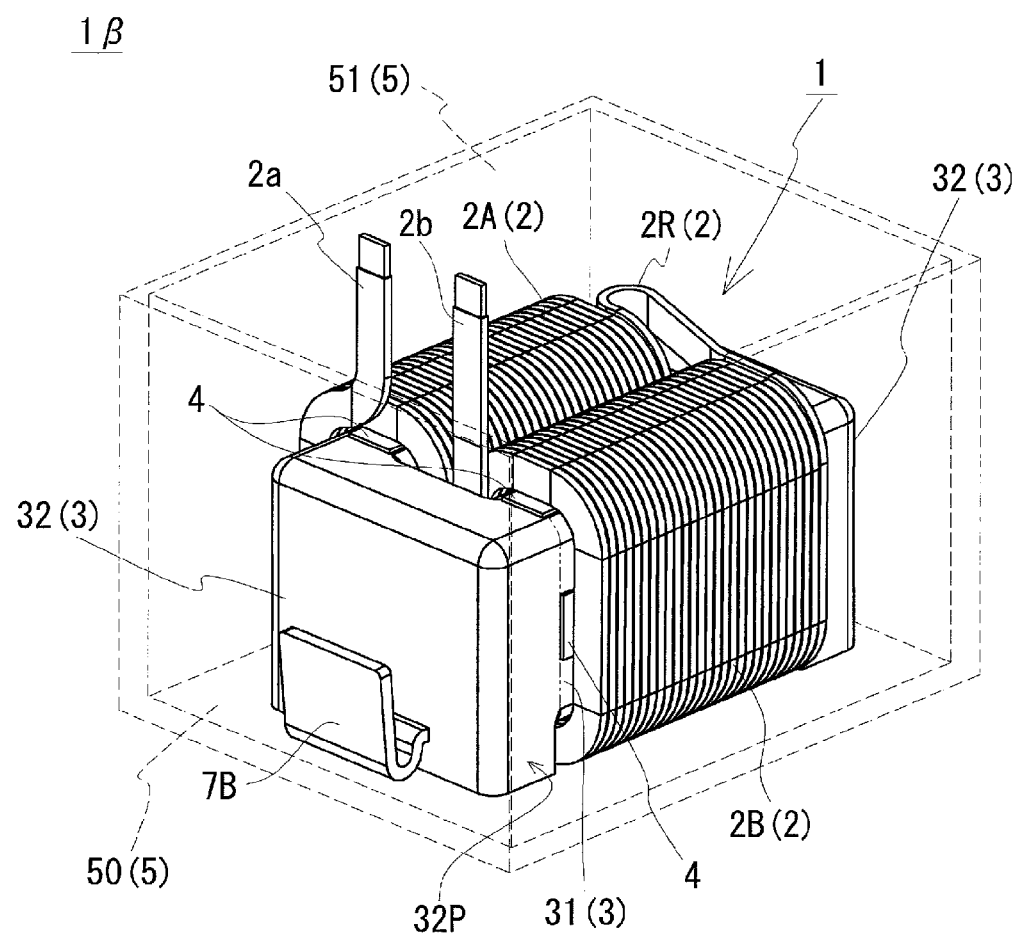
Figure 5:
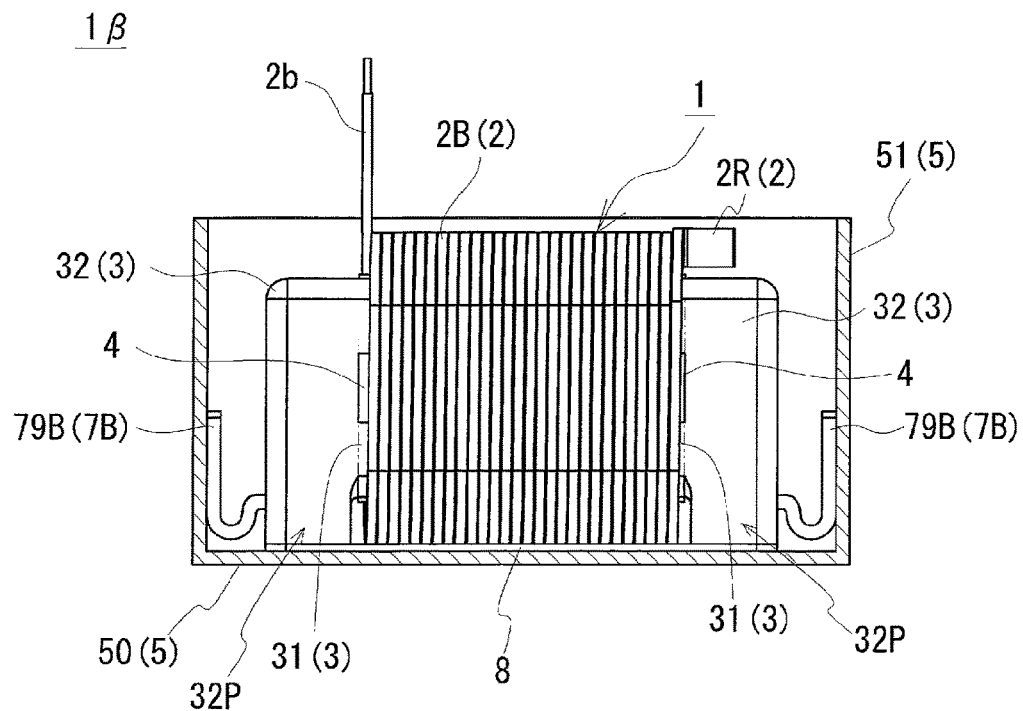
FIG. 5 is a schematic partial cross-sectional view of the reactor according to Embodiment 2 viewed from the side.

As shown in FIGS. 4 and 5, the case 5 has a tubular shape having a bottom and is constituted by a bottom plate 50 and side walls 51. In this case, the bottom plate 50 of the case 5 also serves as a placement plate on which the assembly 1 is placed. A converter case can also be utilized as the case 5 for accommodating the assembly 1.

The bottom plate 50 and the side walls 51 that constitute the case 5 may be integrated with each other, or separately prepared bottom plate 50 and side walls 51 may be joined later. In the latter case, the bottom plate 50 and the side walls 51 can be made of different materials. For example, the bottom plate 50 can be made of aluminum or an alloy thereof, and the side wall 51 can be made of resin such as PPS.

A state in which the assembly 1 is embedded in a potting resin may also be achieved by filling the case 5 with the potting resin (note shown) after the assembly 1 is accommodated in the case 5. The assembly 1 can be physically protected from an external environment by the potting resin. Examples of the potting resin include epoxy resins, urethane resins, and silicone resins. The heat dissipation property of the potting resin may also be increased by adding a ceramic filler to the potting resin.

Positioning Member

Figure 6:
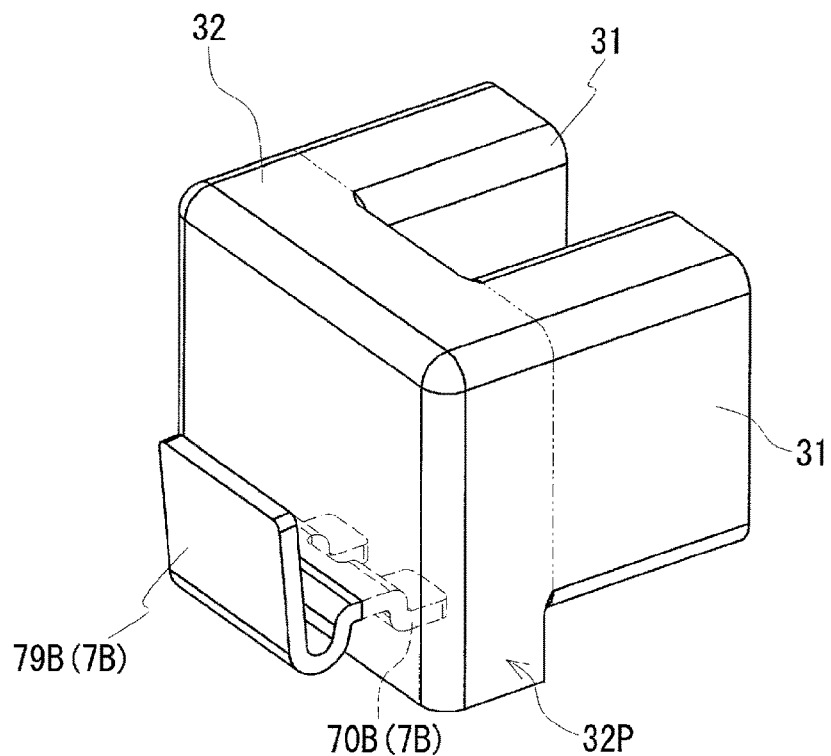
FIG. 6 is a perspective view of a split core that is partially seen through and is provided in the reactor according to Embodiment 2.

As shown in FIG. 6, the positioning member 7B includes an embedded portion 70B that is embedded in an outer core portion 32 and a functional portion 79B that protrudes outward from the outer core portion 32. As shown in FIGS. 4 and 5, the functional portion 79B exhibits the actual function of the positioning member 7B that positions the assembly 1 in the case.

The embedded portion 70B is embedded in a lower protruding portion 32P of the outer core portion 32. The embedded portion 70B has a width that is approximately about 50% of the width of the outer core portion 32 (the length in the direction in which the winding portions 2A and 2B are arranged in parallel with each other). Also, the embedded portion 70B has a step and this level difference retains the core.

On the other hand, the functional portion 79B is formed like a plate spring (elastic piece). Specifically, the functional portion 79B extends outward from the outer core portion 32, bends toward the lower side of the reactor 1β, bends toward the upper side (toward the top in FIGS. 4 and 5) of the reactor 1βinto a U-shape, and thereby is formed like a plate spring (see FIGS. 4 and 5 together). As shown in FIG. 5, the functional portion 79B of the positioning member 7B warps inward (toward the center in the axial direction of the winding portion 2B) by inserting the assembly 1 including such a positioning member 7B into an upper opening of the case 5. Because the functional portion 79B presses against the inner wall surface (the inner circumferential surface of the side wall 51) of the case 5 with a reaction force of warping, the position of the assembly 1 is fixed in the case 5.

Similarly to the fixing member 7A (FIG. 3 and the like) in Embodiment 1, the positioning member 7B may also be made of metal or resin.

Effect

According to the reactor 1β in this example, it is possible to fix the position of the assembly 1 in the case 5 with the positioning member 7B. Also, similarly to Embodiment 1, when the assembly 1 is produced by assembling the magnetic core 3 into the coil 2, the arrangement of the positioning member 7B with respect to the assembly 1 also ends, and thus the reactor 1β in this example has excellent productivity.

Embodiment 3

In Embodiment 3, with reference to FIGS. 7 to 10, a reactor 1γ will be described in which a sensor holding member (accessory member) 7C for fixing a temperature sensor 6 at a predetermined position is embedded in addition to the positioning member 7B described in Embodiment 2.

Figure 7:
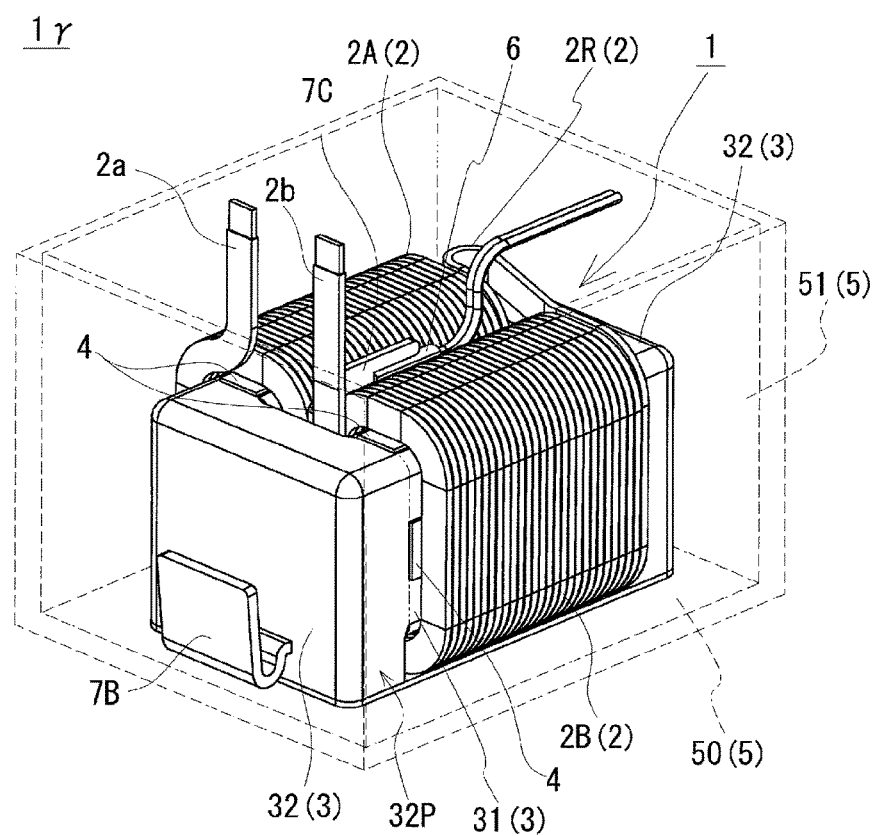

As shown in FIG. 7, the reactor 1γ in this example includes the temperature sensor 6 disposed between winding portions 2A and 2B of a coil 2. The position at which the temperature sensor 6 is disposed is located between the winding portions 2A and 2B that generate heat, and thus the temperature at this position easily increases. If the temperature at this position can be measured, it is possible to react, for example, to stop the operation of the reactor 1γ when the temperature increases excessively and impairment of the reactor 1γ is suppressed. This temperature sensor 6 is held at a predetermined position by the sensor holding member 7C.

Sensor Holding Member

Figure 8:
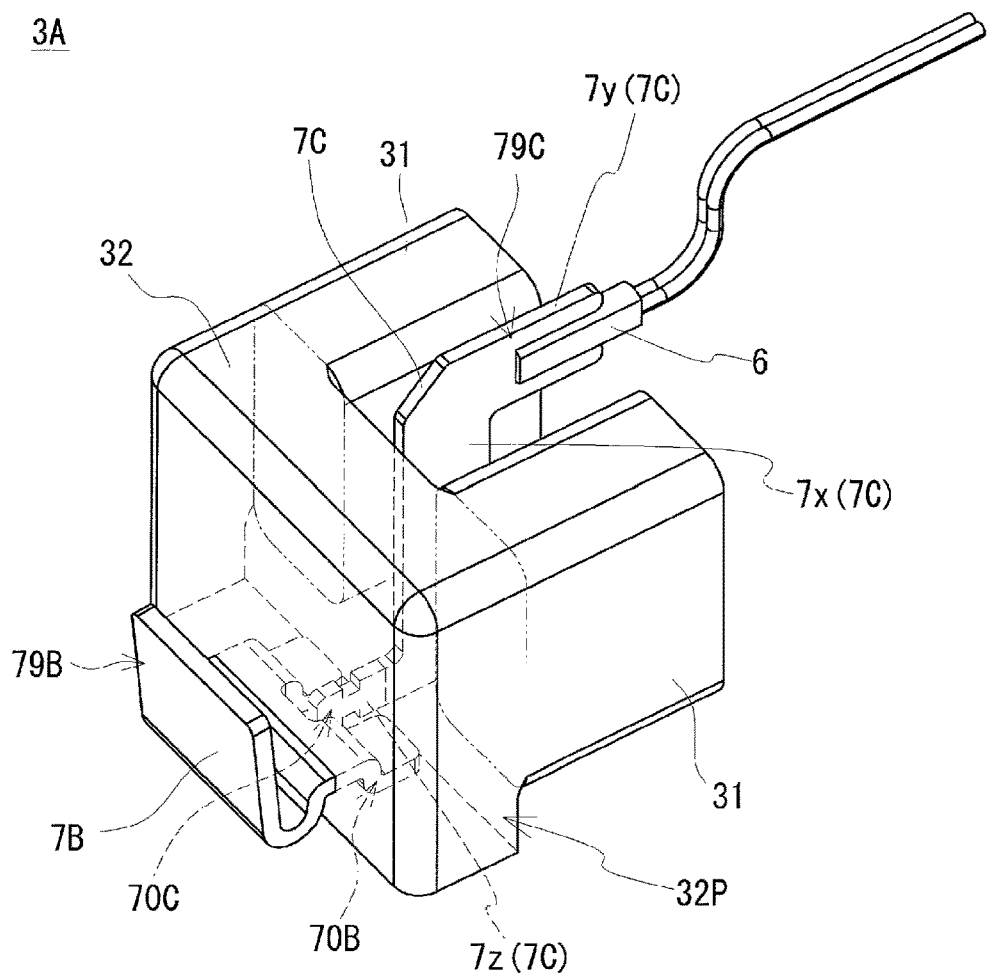
FIG. 8 is a perspective view of a split core that is partially seen through and is provided in the reactor according to Embodiment 3.
Figure 9:
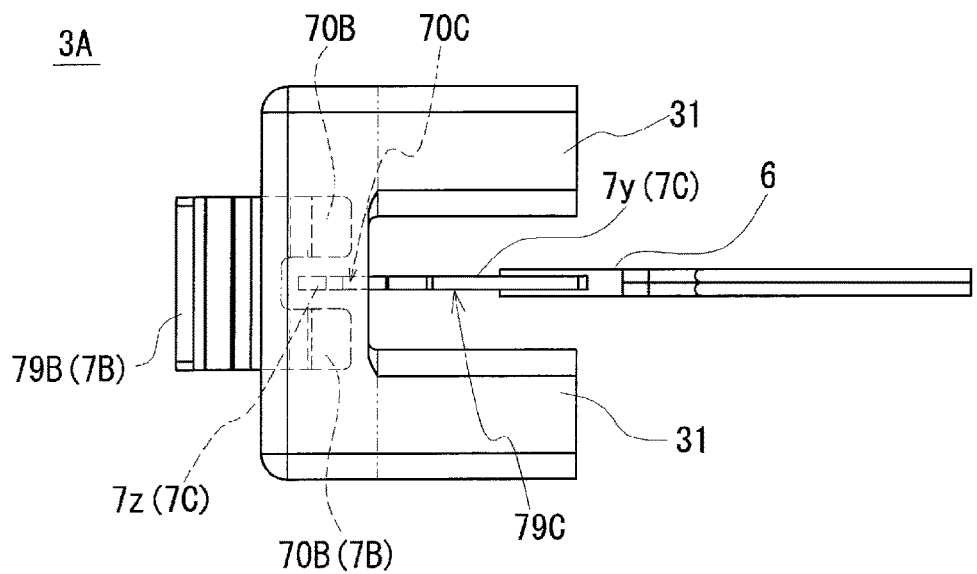
FIG. 9 is a top view of the split core that is partially seen through and is provided in the reactor according to Embodiment 3.
Figure 10:
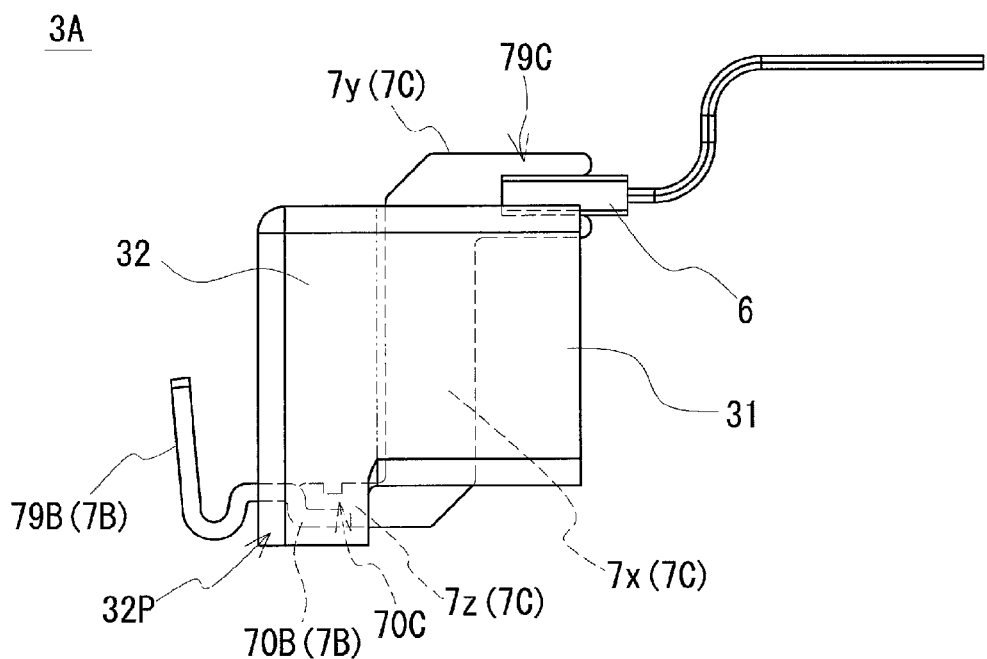
FIG. 10 is a side view of the split core that is partially seen through and is provided in the reactor according to Embodiment 3.

As shown in FIGS. 8 to 10, when viewed from the side of the outer core portion 32, the sensor holding member 7C is an approximately S-shaped plate member constituted by a base piece 7x extending in the vertical direction, an upper piece 7y connecting with an upper end of the base piece 7x, and a lower piece 7z connecting with a lower end of the base piece 7x. Since the sensor holding member 7C has a plate shape, it is possible to dispose the sensor holding member 7C in the narrow space between the winding portions 2A and 2B while securing the strength of the sensor holding member 7C.

This sensor holding member 7C is preferably made of resin by molding. With this configuration in this example, the base piece 7x of the sensor holding member 7C is disposed between the winding portions 2A and 2B (see FIG. 7), and thus, the base piece 7x can have the function of securing insulation between the winding portions 2A and 2B by the sensor holding member 7C being made of resin by molding. If the sensor holding member 7C is made of a thermoplastic resin, it is preferable to select a resin that does not soften at a temperature at which the resin of the composite material is cured.

The lower piece 7z of the sensor holding member 7C constitutes an embedded portion 70C that is embedded in a lower protruding portion 32P of an outer core portion 32. Here, the embedded portion 70B of the positioning member 7B described in Embodiment 2 is provided with a notch having a recessed shape. The lower piece 7z (the embedded portion 70C) of the sensor holding member 7C is inserted into this notch. The lower piece 7z has a portion whose width is locally narrow, and a level difference in the narrow portion serves as a retainer that inhibits the lower piece 7z (the embedded portion 70C) from coming off from the outer core portion 32.

The base piece 7x and the upper piece 7y of the sensor holding member 7C constitutes a functional portion 79C protruding outward from the outer core portion 32. A tip of the upper piece 7y that constitutes the functional portion 79C is provided with an accommodation portion having a recessed shape that accommodates the temperature sensor 6. It is possible to precisely position the temperature sensor 6 with this accommodation portion. The position of the upper piece 7y for positioning the temperature sensor 6 with respect to the assembly 1 can be disposed at an appropriate position by adjusting the length of the base piece 7x.

Effect

According to the reactor in this example, it is possible to monitor the temperature with the sensor holding member 7C during operation of the reactor 1γ. When the assembly 1 is produced by assembling the magnetic core 3 into the coil 2, the arrangement of the sensor holding member 7C with respect to the assembly 1 also ends, and thus, the reactor in this example has excellent productivity.

Here, the sensor holding member 7C can also be used alone or used in combination with the fixing member 7A in Embodiment 1.

Modification 1

Although the magnetic core 3 is constituted by combining two split cores in Embodiments 1 to 3, a magnetic core may also be constituted by combining three or more split cores. For example, in the reactor 1α in Embodiment 1, the magnetic core 3 may also be constituted by a pair of columnar core pieces that serve as the inner core portions 31 and a pair of block-shaped core pieces that serve as the outer core portions 32 (in this case, the number of partitions is four).

Modification 2

Although a coil 2 including a pair of winding portions 2A and 2B is used in Embodiments 1 to 3, a coil including one winding portion may also be used. In this case, a magnetic core need only be constituted by for example, preparing a pair of core pieces having an approximately E-shape, and inserting, into the inside of the winding portion, the protruding portion located at the center of the E-shaped core piece.

Modification 3

Although the outer core portion 32 includes the lower protruding portion 32P protruding downward in the height direction of the reactor in Embodiments 1 to 3, a configuration is possible in which the outer core portion 32 includes an upper protruding portion protruding upward in the height direction of the reactor. In this case, the fixing member 7A in Embodiment 1, the positioning member 7B in Embodiment 2, and the sensor holding member 7C in Embodiment 3 may be embedded in the upper protruding portion.

Modification 4

The accessory member includes all of the members that directly or indirectly contribute to appropriate functions of the reactor. Examples of accessory members other than the accessory member shown in Embodiments 1 to 3 includes a heat dissipation member for suppressing failure caused by heat generated in the reactor, a terminal board, which is the base for attaching a connection terminal required to supply power to the reactor, and the like.

The reactor according to the above-described embodiments can be suitably utilized in applications where its current supply conditions are such that the maximum electric current (direct current) is about 100 A to 1000 A, an average voltage is about 100 V to 1000 V, and a frequency that is used is about 5 kHz to 100 kHz, typically, in a constituent component of an in-vehicle power conversion device for an electric car, a hybrid car, and the like. In this application, it is expected to suitably utilize a reactor in which the inductance at a direct current supply of 0 A is at least 10 µH and not more than 2 mH, and the inductance at the maximum current supply reaches at least 10% of the inductance at a direct current supply of 0 A.

INDUSTRIAL APPLICABILITY

The reactor of the present invention can be utilized in a constituent component of a power conversion device such as a bidirectional DC-DC converter or the like that is installed in an electrically driven vehicle such as a hybrid car, an electric car, or a fuel cell car.

The invention claimed is:

1. A reactor comprising:
an assembly of a coil having a winding portion and a magnetic core;
an accessory member that is attached to the assembly; and
a placement plate on which the assembly is placed,
wherein an outer core portion of the magnetic core is made of a composite material obtained by dispersing soft magnetic powder in a resin, the outer core portion protruding from the winding portion,
the accessory member is a fixing member for fixing the assembly on the placement plate, and includes an embedded portion that is embedded in the outer core portion and a functional portion that protrudes outward from the outer core portion, and
the functional portion has a leg-shape and is fastened to the placement plate.

2. The reactor according to claim 1,
wherein the magnetic core includes an inner core portion that is disposed inside the winding portion,
the outer core portion has a protruding portion that protrudes downward and/or upward in a height direction of the reactor with respect to the inner core portion, and
the embedded portion is embedded in the protruding portion.

3. A reactor comprising:
an assembly of a coil having a winding portion and a magnetic core;
an accessory member that is attached to the assembly; and
a case for accommodating the assembly,
wherein an outer core portion of the magnetic core is made of a composite material obtained by dispersing soft magnetic powder in a resin, the outer core portion protruding from the winding portion,
the accessory member is a positioning member that is in contact with an inner circumferential surface of the case and positions the assembly in the case, and includes an embedded portion that is embedded in the outer core portion and a functional portion that protrudes outward from the outer core portion, and
the functional portion is formed with an elastic piece.

4. The reactor according to claim 3,
wherein the magnetic core includes an inner core portion that is disposed inside the winding portion,
the outer core portion has a protruding portion that protrudes downward and/or upward in a height direction of the reactor with respect to the inner core portion, and
the embedded portion is embedded in the protruding portion.

5. A reactor comprising:
an assembly of a coil having a winding portion and a magnetic core;
an accessory member that is attached to the assembly; and
a temperature sensor for measuring a temperature of the reactor,
wherein an outer core portion of the magnetic core is made of a composite material obtained by dispersing soft magnetic powder in a resin, the outer core portion protruding from the winding portion, and
the accessory member is a sensor holding member for holding the temperature sensor, and includes an embedded portion that is embedded in the outer core portion and a functional portion that protrudes outward from the outer core portion.

6. The reactor according to claim 5,
wherein the magnetic core includes an inner core portion that is disposed inside the winding portion,
the outer core portion has a protruding portion that protrudes downward and/or upward in a height direction of the reactor with respect to the inner core portion, and
the embedded portion is embedded in the protruding portion.

* * * * *